J. C. MITCHELL.
DUMPING BUCKET.
APPLICATION FILED NOV. 9, 1915. RENEWED JAN. 9, 1919.
1,312,705.
Patented Aug. 12, 1919.
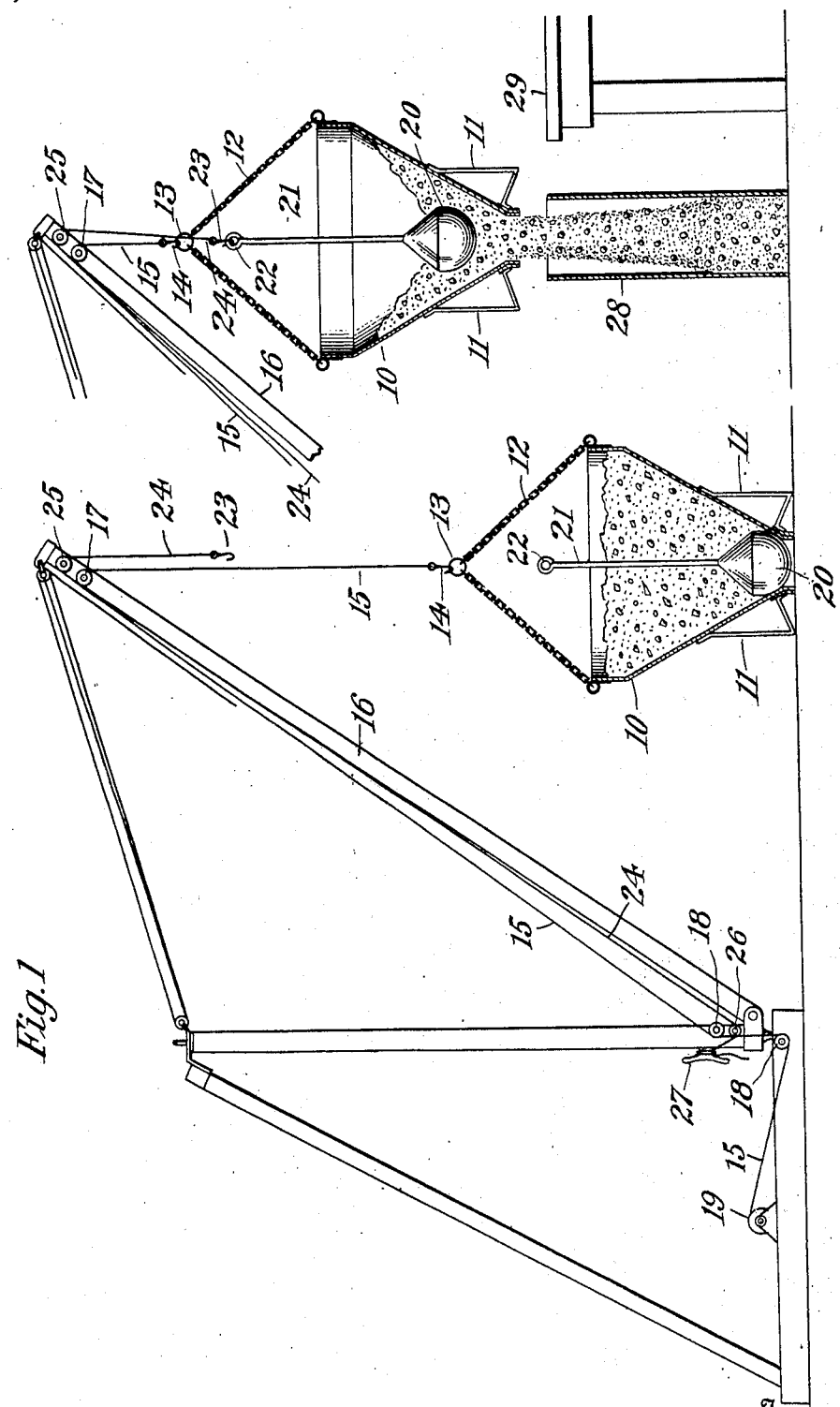

UNITED STATES PATENT OFFICE.

JOHN C. MITCHELL, OF EAST ORANGE, NEW JERSEY.

DUMPING-BUCKET.

1,312,705.      Specification of Letters Patent.      Patented Aug. 12, 1919.

Application filed November 9, 1915, Serial No. 60,471. Renewed January 9, 1919. Serial No. 270,437.

*To all whom it may concern:*

Be it known that I, JOHN C. MITCHELL, a citizen of the United States, residing at East Orange, in the county of Essex and State of New Jersey, have invented certain new and useful Improvements in Dumping-Buckets, of which the following is a full, clear, and exact description.

This invention relates to dumping buckets, particularly buckets for conveying concrete and discharging into a mold or form. In molding concrete pipe the buckets heretofore in use have not proved altogether satisfactory, especially where the pipe to be molded is of small size. In such case the rate of outflow is too fast; and if effort is made to diminish the rate by making the discharge orifice of the bucket smaller the concrete frequently, in fact, usually, packs in the orifice and will not flow at all unless poked out with a stick. It is accordingly the chief object of the invention to provide a bucket that will discharge at any desired rate without choking, the rate of discharge and the instant of discharge being under complete control. Another object is to provide a bucket without working parts such as levers, hinges, bolts, cams, and the like, which can be clogged with concrete. A further object is to provide a bucket that can be cleaned easily and effectively. To these and other ends the invention consists in the novel features of construction and combinations of parts hereinafter described.

One form of the invention is illustrated in the accompanying drawing, in which—

Figure 1 is a side view showing the bucket in section and attached to the derrick.

Fig. 2 is a similar view showing the bucket suspended over a mold, with the contents discharging into the mold.

The bucket 10, or at least its lower portion, is conical in form, that is, tapering downwardly, and its lower end is open. To make the bucket more stable when standing on the ground it is provided with three or more legs, preferably four, of which two are shown at 11. The bucket preferably has a bail composed of chains 12 connected to a ring 13 for engagement with a hook 14 on the fall-rope 15 of the derrick 16. The fall-rope runs over sheaves 17, 18, to the drum 19 which is driven by the usual engine or motor, not shown.

The discharge opening is closed by a plug 20, the upper portion of which is conical and the lower portion spherical; the latter being more than a hemisphere, so that the plug can take any position in the bucket and still close the opening in the bottom. The plug is manipulated and controlled by means of a vertical rod 21 securely fastened in the apex of the conical portion and terminating in a hook or eye 22 for engagement with a hook 23 on the dumping line 24. The latter passes over sheaves 25, 26, on the boom 16, and is secured by belaying it around a cleat 27.

The plug 20 being in place, the bucket is loaded and hoisted to the proper position for dumping, (say above the form or mold indicated at 28, Fig. 2), with the eye 22 above the hook 23 on the dumping line 24, which, as stated, is made fast to the cleat 27 and hence cannot pay out over the sheave 25. The workman on the platform 28 then connects the hook 23 to the eye 22, and the bucket is lowered. Since the plug 20 cannot descend with the bucket, the lowering of the latter is equivalent to raising the plug, thus opening the discharge aperture and allowing the concrete to pour out. Moreover, the movement of the bucket and plug has the effect of agitating the contents at the discharge opening, thereby effectually overcoming the tendency of the concrete to pack in and choke the opening. The discharge opening is in effect annular being the space between the wall of the bucket and the spherical bottom of the plug; and its effective area, and hence the rate of discharge, depends upon the extent of the relative movement of the two parts. That is, with the plug held against downward movement, the farther the bucket is lowered the more rapidly it will empty. By properly adjusting the height of the hook 23 with respect to the mold the rate of discharge can be accurately regulated to suit the work in hand. Of course the discharge aperture can be opened by raising the plug, but in general the method described is more convenient.

The dumping may, if desired, be controlled by the derrick operator. In such case the dumping line is hooked to the plug before the bucket is hoisted and is drawn taut and made fast to the cleat when the bucket is in position over the mold. Then the bucket is lowered as described.

The bucket and plug are in effect self-cleaning as the flow of concrete scours them bright and clean at each dumping operation, and there are no projecting parts on which concrete can find easy lodgment. However, if it is ever necessary to clean the parts, as may happen when the apparatus has been long out of use, the plug can be quickly removed, leaving the whole interior of the bucket accessible.

It will be observed that if while the bucket is emptying, the line 24, by which the ball 20 is suspended, be slacked off, the weight of the ball, or the weight of the material in the bucket above the ball, or both, will seat the latter down into the discharge opening and thus close the opening; and it will also be noted that when the discharge opening is closed the ball is held in the opening by the weight of the material on top of it. These are important features, as it is thus possible to close the discharge opening almost instantly whenever the desired amount has been discharged, by merely slacking the dump-line 24 without touching the bucket or any part of it, and the operator can be certain that the opening will remain closed until he desires to deliver more material. If while the bucket is discharging, the material should pack in the opening, the flow can be started again by raising and lowering the bucket slightly, the movement relative to the ball being sufficient to break any "arch" that may form across the bottom of the bucket.

It is to be understood that the invention is not limited to the construction herein specifically described but can be embodied in other forms without departure from its spirit.

I claim:—

1. A bucket for concrete adapted to discharge its contents through the bottom, comprising a receptacle the lower portion of which has a steep downward taper and a circular opening at its apex; the interior of the said tapered portion being free of obstructions and the inner surface thereof being smooth, to permit free and unobstructed flow of the concrete downwardly to the said opening; with a closure for the opening, comprising a body having a spherical lower portion of larger diameter than the opening and having its upper part formed to shed the concrete downwardly and laterally and prevent accumulation of concrete thereon, and a member attached to the said closure at the top and extending upwardly by which the closure can be raised and lowered independently of the receptacle.

2. A bucket for concrete adapted to discharge its contents through the bottom, comprising a receptacle the lower portion of which has a downward taper and a circular opening at its narrowest portion; the interior of the tapered portion being free from obstructions and the inner surface thereof being smooth, to permit free and unobstructed flow of the concrete downwardly to the said opening; and a closure for the opening, comprising a body having a spherical lower portion of larger diameter than the opening and having a steeply tapering conical upper portion whereby to shed the concrete downwardly and laterally and prevent accumulation of concrete thereon, and a member attached to the apex of the upper conical portion and extending upwardly by which the closure can be raised or lowered independently of the receptacle.

3. A bucket for concrete adapted to discharge its contents through the bottom, comprising a receptacle the lower portion of which has a steep downward taper and a circular opening at its narrowest portion, the interior of the tapered portion being free from obstructions and the inner surface thereof being smooth, to permit free and unobstructed flow of concrete downwardly to the said opening; and a closure for the opening, comprising a body having a spherical lower portion of larger diameter than the opening and having its upper part in the form of a steep cone to shed the concrete downwardly and laterally and prevent accumulation of the concrete thereon, and a rod or stem attached to the said closure at the apex of its upper conical portion and extending upwardly by which the closure can be raised and lowered independently of the receptacle.

In testimony whereof I hereunto affix my signature.

JOHN C. MITCHELL.